United States Patent [19]

Stitch

[11] 4,066,094
[45] Jan. 3, 1978

[54] COMBINATION DRAIN SUMP AND AIR PRESSURE CHAMBER FOR AUTOMATIC CLOTHES WASHING MACHINE

[75] Inventor: Richard C. Stitch, Louisville, Ky.

[73] Assignee: General Electric Company, Louisville, Ky.

[21] Appl. No.: 667,642

[22] Filed: Mar. 17, 1976

[51] Int. Cl.² ............... D06F 23/04; D06F 33/02
[52] U.S. Cl. ............................ 137/387; 68/12 FA
[58] Field of Search ............... 137/247.35, 590, 387, 137/403; 200/83 WM; 68/12 FA, 208

[56] References Cited
U.S. PATENT DOCUMENTS

| 2,564,172 | 9/1951 | Roaberg et al. | 137/247.35 X |
|---|---|---|---|
| 3,367,153 | 2/1968 | Brobaker et al. | 137/387 X |
| 3,575,020 | 4/1971 | Hubbard | 68/12 R X |
| 3,590,606 | 7/1971 | Takeyama | 68/208 |
| 3,648,487 | 3/1972 | Hoffman | 137/387 X |

Primary Examiner—William R. Cline
Attorney, Agent, or Firm—Frederick P. Weidner; Francis H. Boos

[57] ABSTRACT

A combination drain sump and air pressure chamber member for use in an automatic washing machine having a switch responsive to air pressure, a tub for holding washing liquid, and a pump for removing the liquid from the machine. The combination comprises a sump member having a side wall and bottom wall with the side wall having an opening in liquid flow communication with the pump. There is an openended dip tube in liquid flow communication with the tub and extends downwardly within the sump below the outlet opening and spaced from the sump walls. An air pressure chamber member is located laterally of and above the sump and a connecting chamber member is arranged in communication at one end with the air chamber member and at the opposite end with the top of the sump member and has a major portion thereof located above the sump outlet opening when viewed in vertical cross-section.

6 Claims, 4 Drawing Figures

COMBINATION DRAIN SUMP AND AIR PRESSURE CHAMBER FOR AUTOMATIC CLOTHES WASHING MACHINE

BACKGROUND OF THE INVENTION

1. Field of the Invention

This invention relates to laundry machines, and more particularly to a combination drain sump and air pressure chamber used in automatic clothes washers.

2. Description of the Prior Art

Automatic clothes washing machines have had drain sumps which act as foreign object traps to prevent rigid items such as hair pins, buttons, etc., from being introduced into the pump mechanism during pumpout of the machine. These items can be harmful to the pump and on many occasions actually cause the pump to fail. One such prior art foreign object trap assembly is shown in U.S. Pat. No. 3,590,606.

Automatic clothes washing machines have also included a water supply system that regulates the amount of water introduced into the machine during the fill period by having an air pressure responsive means controlling a valve for stopping the introduction of water when a predetermined level is reached. One such prior art system uses a pressure sealed sump having an integral air trapping chamber in which air is compressed directly in proportion to the amount of water being introduced into the washing machine tub. See for example U.S. Pat. No. 3,367,153. When the air pressure reaches a certain value and a pressure responsive switch is actuated in response to that value, the water inlet valves are turned off. As an example of one such pressure responsive switch, see U.S. Pat. No. 2,934,618. One of the difficulties with such a pressure actuated liquid level responsive arrangement is that the very small diameter tubing leading from the air chamber to the pressure responsive switch is easily blocked by suds causing malfunction of the system. The suds are present in the system as a result of the previous pumping out operation of the wash water as the system cannot be completely evacuated.

By my invention, I have provided a combination drain sump that acts as a foreign object trap and an air pressure chamber member that will prevent blockage of the air pressure between the air chamber and the pressure responsive switch.

SUMMARY OF THE INVENTION

There is provided in an automatic clothes washing machine having an air pressure responsive switch, a tub for holding washing liquid, and a pump for removing the liquid from the machine, the combination of a drain sump and an air pressure chamber member. The drain sump member has a side wall and a bottom wall with the sump side wall having an outlet opening in liquid flow communication with the pump of the washing machine. Located within the walls of the sump member is an open ended dip tube which is in liquid flow communication with the washing machine tub and extends downwardly within the sump side wall below the outlet opening and spaced from the sump side and bottom walls. There is also provided an air pressure chamber member located laterally of and above the sump member which air pressure chamber member has an open base portion, a side wall, and a top end wall with an air port in air pressure communication with the air pressure responsive switch of the washing machine. Joining the sump member and air pressure chamber member is a connecting chamber member which is in communication at one end with the base of the air chamber member and at the opposite end with the top of the sump member. A major portion of the connecting chamber member is located above the sump outlet opening.

DESCRIPTION OF THE PREFERRED EMBODIMENT

Figure 1:
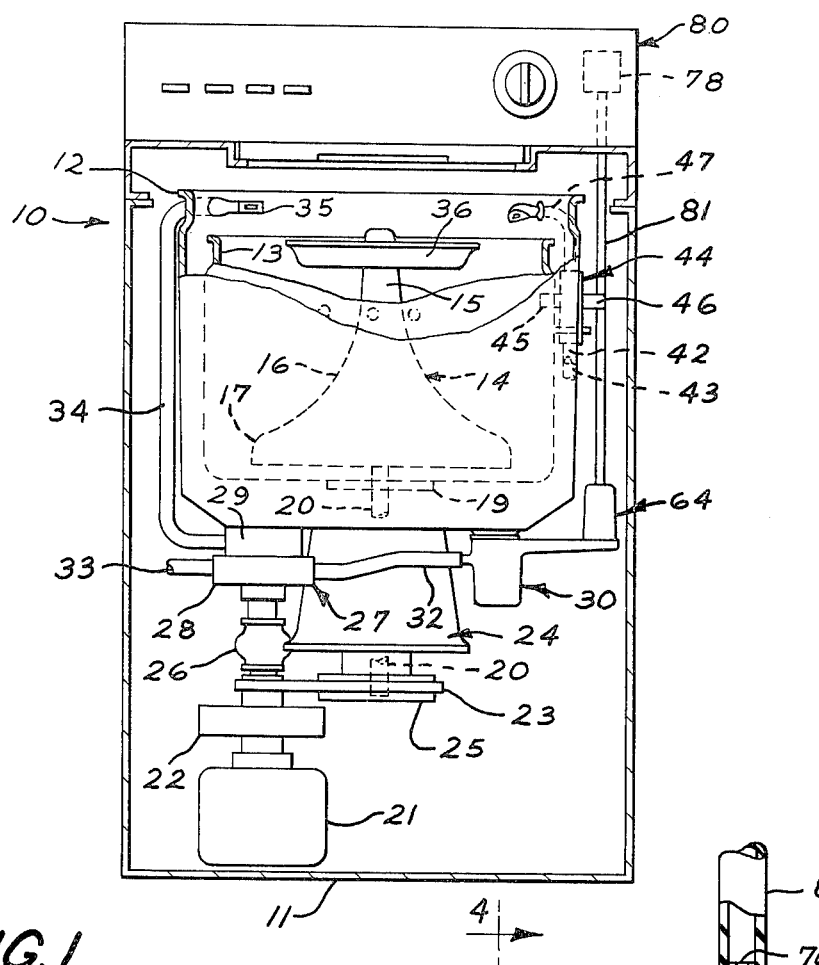
FIG. 1 is a schematic front elevational view of a clothes washing machine incorporating my invention, the view being partly broken away and partly in section.

Referring now to the drawing, and initially to FIG. 1 thereof, there is illustrated an agitator-type vertical-axis automatic clothes washer 10 having a supporting structure or load member 11. The washer may include the various operational components conventionally utilized in a domestic automatic washing machine, for instance, an imperforate tub 12 rigidly mounted within structure 11. Rotatably supported within tub 12 is a perforate washing basket 13 for washing and rinsing clothes therein and for centrifugally extracting liquid therefrom. At the center of basket 13 there is provided an agitator 14 which includes a center post 15 having a plurality of water or liquid circulating vanes 16 joined at their lower end to form an outwardly flared skirt 17.

Both the clothes basket 13 and the agitator 14 are rotatably mounted. The basket 13 is mounted on a hub 19 and the agitator 14 is mounted on a shaft 20 which extends upwardly through the hub 19 and through the center post 15 and is secured to the agitator so as to drive it. During one cycle of operation of the washer 10, fabrics, detergent, and a predetermined quantity of liquid are introduced into the tub 12 and basket 13, and the agitator is then oscillated back and forth about its axis to move the clothes within the basket. After a predetermined period of this washing action, the agitator and basket 13 are rotated in unision at high speed to centrifugally extract the washing liquid from the fabrics and discharge it to a drain (not shown). Following this extraction operation, a supply of clean liquid is introduced into the basket for rinsing the fabrics and the agitator is again oscillated. Finally, the agitator and basket are once more rotated in unison at high speed to extract the rinse liquid.

The basket 13 and agitator 14 may be driven by any suitable means. By way of example, I have shown them as driven by a reversible motor 21 through a drive mechanism including a clutch 22 mounted on the motor shaft. The motor is tailored so as to be used to its full extent when it accelerates the basket 13 to spin speed. In order to assist the motor during starting, clutch 22 allows the motor to start with less than a full load and then accept the full load as it comes up to speed. A suitable belt 23 transmits power from clutch 22 to a transmission assembly 24 through a pulley 25. Thus, depending upon the direction of motor rotation, the pulley 25 of transmission 24 is driven in opposite directions. The transmission 24 is so arranged that it supports and drives both the agitator drive shaft 20 and the basket mounting hub 19. When motor 21 is rotated in one direction, the transmission causes agitator 14 to oscillate and when motor 21 is driven in the opposite direction, the transmission causes the clothes basket 13 and agitator 14 to rotate together at high speed for centrifugal fluid extraction.

In addition to operating the transmission 24 as described, motor 21 also provides a direct drive through a flexible coupling 26 to a pump structure 27, which includes two separate pumping units 28 and 29 which are operated simultaneously in the same direction by motor 21. Pump unit 28 has an inlet connected to a sump assembly 30 by a conduit 32 and an outlet connected by a conduit 33 to a suitable external drain (not shown). Pump 29 has an inlet connected to the interior of tub 12 and an outlet connected by conduit 34 to a nozzle 35 which is positioned to discharge into a suitable perforate bottomed filter pan 36 which may be secured to the top portion of agitator 14 so as to be movable therewith but removable therefrom. With this structure, then, when the motor 21 is operating so as to provide the washing mode or agitation, pump unit 29 draws liquid in from tub 12 and discharges it through conduit 34 into filter pan 36, and then down through the small openings provided in the bottom of the filter pan back into the basket. Conversely, when the motor is reversed so as to rotate the basket 13 and agitator 14 together at high speed to centrifugally extract fluid from fabrics in the basket, pump unit 28 will draw liquid from the tub through sump 30 and conduit 32 and discharge it through conduit 33 to drain. Each of the pump units is substantially inoperative in the direction of rotation in which it is not used.

Hot and cold water may be supplied to the machine through conduits 42 and 43 which are adapted to be connected respectively to sources of hot and cold water (not shown). Conduits 42 and 43 extend into a conventional mixing valve structure 44 having solenoids 45 and 46 and being connected to a hose 47. In a conventional manner selective or concurrent energization of solenoids 45 and 46 will provide the passage of hot, cold or warm water from the mixing valve 44 through the hose 47. Hose 47 is positioned to discharge into the basket 13 so that when one or both of solenoids 45 and 46 are energized, water enters basket 13 and tub 12.

Figure 2:
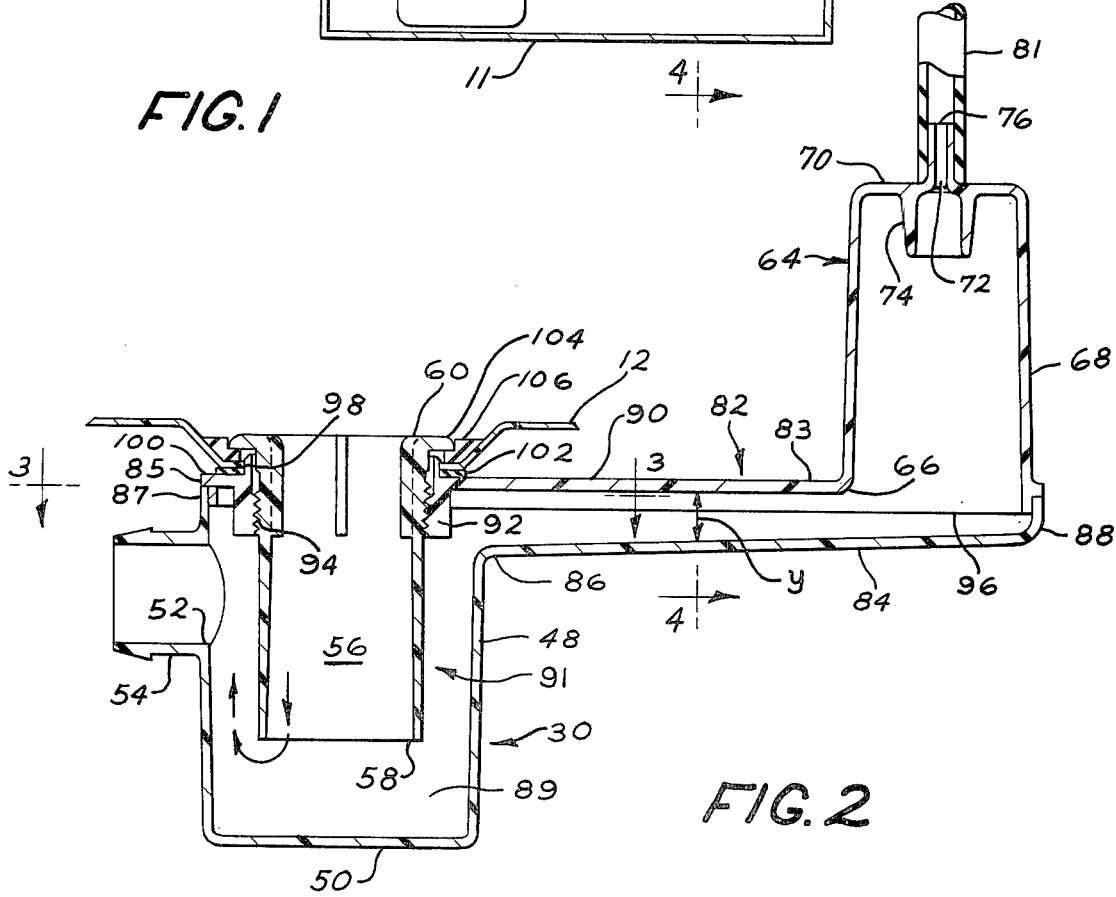
FIG. 2 is a side plan view of the combination drain sump and air pressure chamber arrangement of the present invention.
Figure 3:
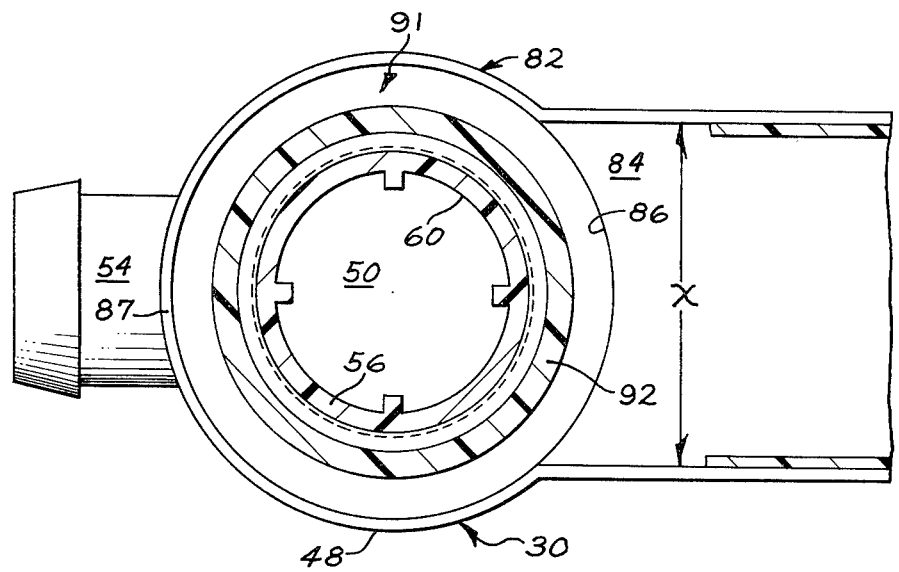
FIG. 3 is a top plan view of the combination drain sump and air pressure chamber member taken along lines 3—3 of FIG. 2.
Figure 4:
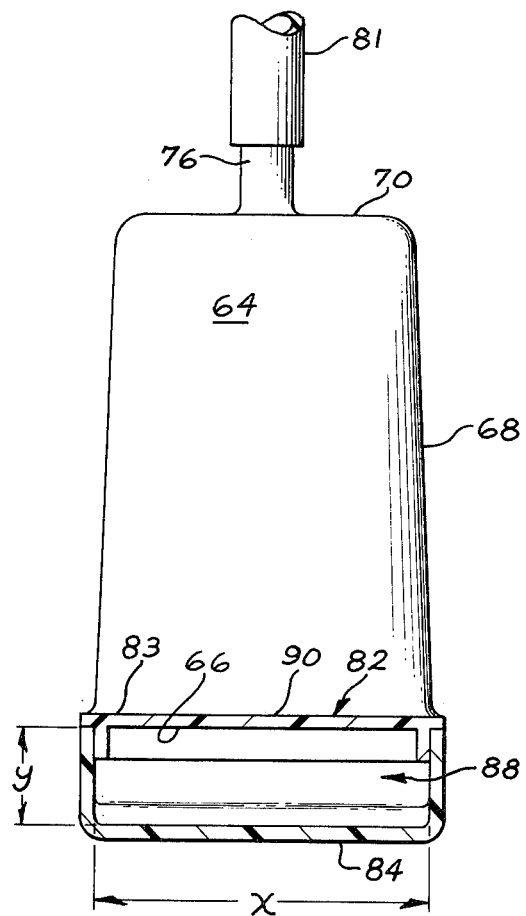
FIG. 4 is a side elevational view of the combination drain sump and air pressure chamber member taken along lines 4—4 of FIG. 2.

With reference in particular to FIGS. 2-4, the combination drain sump and air pressure chamber member is shown in detail. The sump assembly 30 includes a cylindrical side wall 48 and a bottom wall 50 which together form a flat bottom cup shaped reservoir or sump. The side wall 48 has an outlet opening 52 which may have an outwardly projecting cylindrical collar 54 to which may be attached conduit 32 as shown in FIG. 1. Within the sump is an open-ended dip tube member 56 which extends downwardly into the sump member 30 and is spaced inwardly of the side wall 48 and has its terminal open end 58 spaced upwardly from the bottom wall 50 of the sump member. The dip tube member 56 is open-ended at both ends with the upper end 60 in liquid flow communication with the interior of the tub 12 and the lower or terminal open end 58 extending downwardly below the outlet opening 52 but spaced from the bottom wall 50 of the sump member.

Remotely located from the sump member 30 is an air pressure chamber member 64 which is in the shape of an inverted cup and includes an open base 66, a generally cylindrical side wall 68 and a top wall 70. The top wall 70 has a centrally located air port 72 which may be surrounded by a downwardly depending circumferential flange 74 and an upwardly depending collar 76. As shown in FIG. 1, an air pressure responsive switch 78 is positioned in the control compartment 80 of the machine 10 and an air pressure tube 81 is attached to the air pressure responsive switch 78 and to the air pressure chamber 64 by securing it to collar 76.

Interconnecting the sump member 30 and the air pressure chamber member 64 is a connecting chamber member 82 which should have a major portion thereof located above the sump outlet opening 52 when viewed in vertical cross-section as shown in FIG. 2. Preferably the entire connecting chamber member 82 is located on a plane above the sump outlet opening 52 and the preferred structural arrangement is shown in the drawings. It will be noted from FIGS. 3 and 4 that the width designated "X" of the connecting chamber member 82 is preferably as wide as the base 66 of the air pressure chamber member 64, and has its one end 83 in communication with that base. The height designated "Y" is quite high so that together "X" times "Y" provides for a substantial cross-sectional area as shown in FIG. 4. The opposite end 85 of the connecting chamber member 82 is in communication with the top 87 of the sump member 30. It will be noted particularly from FIG. 3 that the connecting chamber member 82 is located circumferentially around the dip tube 56 to provide a channel 91 around and spaced outwardly of the dip tube member 56. The channel 91 is in fluid flow communication between the one end 83 of the connecting chamber member 82 and the outlet opening 52, so that any liquid that may be in the connecting chamber member 82 will be more readily available for withdrawing through the outlet opening 52 during a pumping out operation rather than any liquid that may be in the lower portion 89 of the sump 30 or entering the lower portion 89 of the sump through the dip tube 56. The reason for this arrangement will be explained subsequently in describing the operation of the combination drain sump and air pressure chamber member.

The combination drain sump and air pressure chamber member are preferably made from suitable molded plastic material and consists of three main components. The first component comprises the sump assembly 30 which includes the collar 54 surrounding the outlet opening 52, the cylindrical side wall 48, the bottom wall 50, and the lower wall portion 84 of the connecting chamber member 82. The lower wall portion 84 extends from the upper end 86 of the side wall 48 over to the remotely located air pressure chamber 64 and terminates in an upwardly directed terminal flange 88 in abutment with the rear portion of base 66. The second component includes the air pressure chamber member 64 and the upper wall portion 90 of the connecting chamber member 82 which extends from the front portion of base 66 of the air pressure chamber member 64 over to the top 87 of the sump member 30. The connecting chamber member 82 at the sump member end portion includes a downwardly depending threaded collar 92 which is located inside the sump member and spaced from the surrounding sump side wall 48. The third component is the dip tube member 56 which has at its upper end 60 an exteriorly located threaded area 94 which threadedly engages the threaded collar 92 of the connecting chamber member 82.

To assemble the above-described three components of the combination drain sump and air pressure chamber member to the tub 12 of the washing machine 10, the first component and second component are joined by any suitable means in sealing relationship with each other along part line 96. The joined assembly is then secured to the bottom of the tub 12 around an opening 98 through the tub by a shoulder portion 100 and a circular sealing gasket 102 interposed between the shoulder portion 100 and the tub 12. To retain the first and second joined components in this position, the third component which is the dip tube member 56, has its upper end 60 in the form of an outwardly directed circular lip 104 which is dimensioned to be of greater diameter than the tub opening 98. Interposed between the circular lip 104 and the tub 12 may also be a circular gasket 106 around the opening 98. By threadedly engaging the dip tube member with the threaded collar 92 and exerting threaded engagement force, the assembly is securely fastened to the tub 12 in a liquid sealing arrangement.

The operation of the above-described combination drain sump and air pressure chamber member will not be discussed. Upon the machine being turned on by the operator, the control system of the machine energizes the solenoids 45 and 46, thus allowing water to enter the machine and then through hose 47 into the basket and the clothes retained therein. As the water level within the tub 12 rises during the fill period, the air within air pressure chamber 64 and connecting chamber member 82 is caused to be compressed, thereby increasing the air pressure. When that air pressure reaches a preselected value within the confined air pressure system, the air pressure responsive switch 78 is actuated, which switch in turn through appropriate controls, will de-energize the solenoids, thus terminating liquid flow into the machine. At this time, when the machine is programmed for full fill, the liquid level in the combination drain sump 30 and connecting chamber member 82 will rise to approximately the height of the open base 66 in the air pressure chamber member and thereby completely fill both the sump member 30 and connecting chamber member 82.

After the washing operation is completed, the controls of the machine start pump unit 28 into operation for discharging the used wash liquid including dirt, foreign objects and suds from the tub 12. This is accomplished by the pump sucking the wash water outwardly through outlet opening 52 of the sump member 30. It will be noted that because the connecting chamber member 82 is in close proximity to the outlet opening 52, that liquid retained in that chamber will be removed first due to the pumping action rather than any liquid that is in the lower portion 89 of the sump member 30 nor any liquid entering the lower portion 89 from the tub 12 through the dip tube 56. By this action, the pressure in air pressure chamber member 64 is quickly reduced to normal, thus causing rapid resetting of the air pressure responsive switch 78. This is highly desirable as unduly prolonged resetting of this switch could detrimentally affect further sequence operations of the machine.

Any relatively large foreign objects, such as toothpicks, hairpins, buttons, etc., entering the drain sump 30 through the dip tube 56 must make an acute turn at the terminal end 58 of the dip tube in order to reach the outlet opening 52 located above the dip tube terminal end. The result is that such foreign objects are trapped and retained in the lower portion 89 of the sump member 30 and not allowed to pass on to the outlet opening 52 and then into the pump where they could detrimentally affect the operation of the pump. It will be noted that when viewed in vertical cross-section (FIG. 2), the configuration of the dip tube 56, the sump side wall 48 and bottom wall 50 are square shaped, thus inhibiting the reverse bend movement shown by arrows in FIG. 2 of the foreign objects into the outlet opening area. In such a trap arrangement it is desirable that the rigid foreign objects be trapped, but other foreign objects such as sand, lint, threads, etc., which can be handled by the pump mechanism are not retained in the lower portion 89 of the sump member 30. For this reason a screen or the like is not employed, and the turbulence of the water passing from the dip tube 56 through the lower portion 89 of the sump member 30 to the outlet opening 52 will allow these objects to pass therethrough and on to the external drain. The desired turbulence of the water may be achieved by changing the relative location of the lower end 58 of the dip tube 56 to the flat bottom wall 50 of the sump member 30.

The used wash liquid which is being drained from the tub 12 through the pump unit 28 contains suds which in prior art arrangements could come into contact and block the air port 72 of the air pressure chamber 64. Such blockage can cause malfunction of the air pressure responsive switch 78, thus preventing solenoids 45 and 46 from being de-energized to stop the introduction of liquid into the machine. By my invention, and specifically by the cooperative arrangement between the air pressure chamber member 64 and the sump member 30 with the large volume of space provided by the connecting chamber member 82, any residual suds left in the system are prevented during the next operation from reaching the air port 72 as they are dissipated by the large volume of liquid in the connecting chamber member 82.

The foregoing is a description of the preferred embodiment of the invention and variations may be made thereto without departing from the true spirit of the invention, as defined by the appended claims.

What is claimed is:

1. In a washing machine having an air pressure responsive switch, a tub for holding washing liquid, and a pump for removing the liquid from the machine, the combination of a drain sump and air pressure chamber member comprising:

a sump member having an upper portion, a lower portion, a side wall, and a bottom wall, said sump side wall having an outlet opening above the lower portion in liquid flow communication with the pump, an open-ended dip tube in liquid flow communication with the tub and extending downwardly within the sump side wall below the outlet opening and into the lower portion and spaced from the sump side and bottom walls, an air pressure chamber member located laterally of and above the sump, said air chamber having an open base, a side wall and a top end wall with an air port, and a connecting chamber member in communication at one end with the base of the air chamber and at the opposite end with the top of the sump member in close proximity to the outlet opening, said connecting chamber member having a major portion thereof located above the sump outlet opening sufficient to remove liquid from the connecting chamber prior to removing liquid from the lower portion of the sump member when viewed in vertical cross-section and having a width in its entirety at least substantially equal to the width of said air chamber base and a height sufficient to provide a substantial cross-sectional flow area.

2. The invention of claim 1 wherein the connecting chamber member is entirely located in a plane above the sump outlet opening when viewed in vertical cross-section.

3. The invention of claim 1 wherein the one end of the connecting chamber member which is in communication with the top of the sump extends completely around the dip tube.

4. The invention of claim 1 wherein the bottom wall of the sump member is planar.

5. The invention of claim 1 wherein the air chamber and upper portion of the elongated chamber member are formed as an integral component and the sump member and lower portion of the elongated chamber member are formed as another integral component, said two components being joined together in sealing arrangement.

6. The invention of claim 1 wherein the elongated air chamber includes a threaded downwardly depending collar portion located inside the sump member and spaced from the sump side wall, the dip tube having complementary threads on the outside wall surface for threadedly engaging the said elongated air chamber member threaded portion.

* * * * *